INVENTOR.
Philip S. Allen
BY
ATTORNEY

Nov. 27, 1951 P. S. ALLEN 2,576,204
FILM TRANSPORTING MECHANISM FOR AUTOMATIC
PHOTOGRAPHIC APPARATUS
Filed Dec. 1, 1947 4 Sheets-Sheet 2
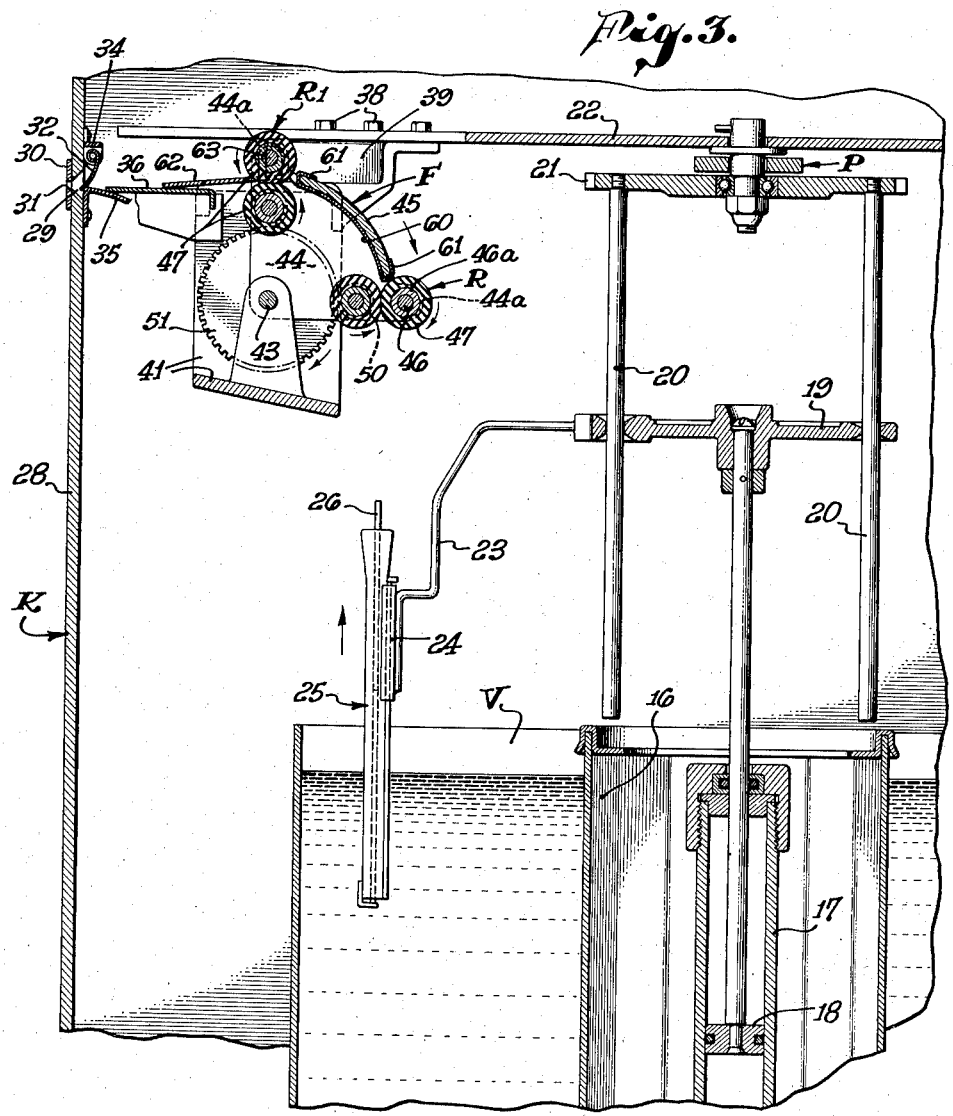
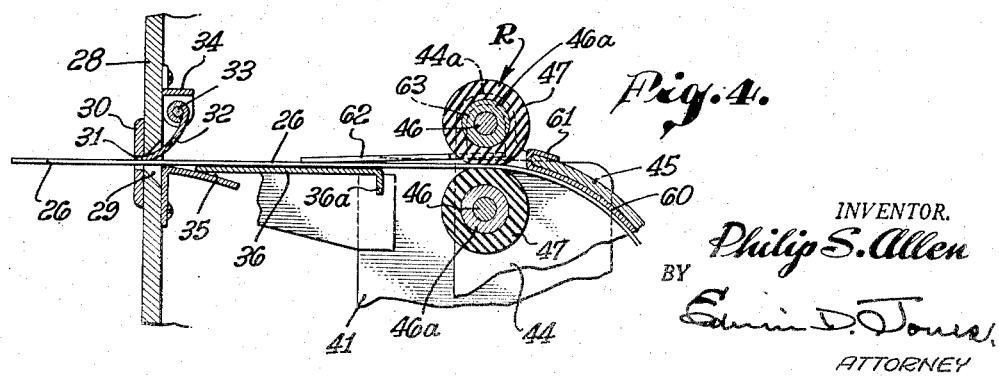
INVENTOR.
Philip S. Allen
BY
Edwin D. Jones
ATTORNEY

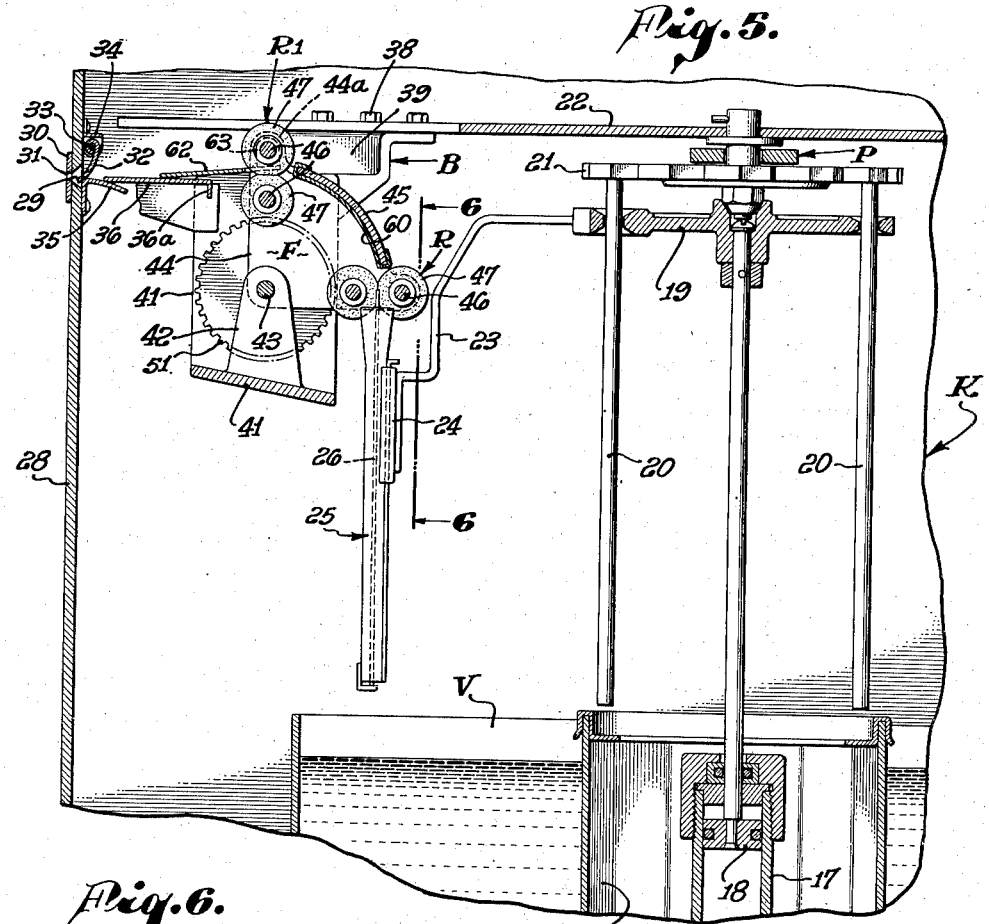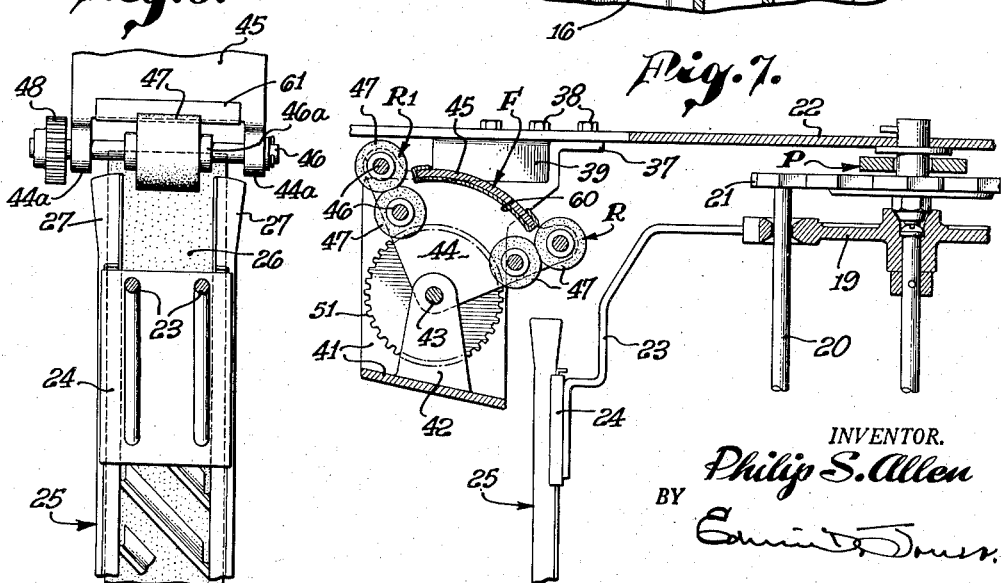

Nov. 27, 1951 P. S. ALLEN 2,576,204
FILM TRANSPORTING MECHANISM FOR AUTOMATIC
PHOTOGRAPHIC APPARATUS
Filed Dec. 1, 1947 4 Sheets-Sheet 4

INVENTOR.
Philip S. Allen
BY
ATTORNEY

Patented Nov. 27, 1951

2,576,204

UNITED STATES PATENT OFFICE 2,576,204

FILM TRANSPORTING MECHANISM FOR AUTOMATIC PHOTOGRAPHIC APPARATUS

Philip S. Allen, Long Beach, Calif.

Application December 1, 1947, Serial No. 789,100

14 Claims. (Cl. 271—81)

My invention relates to film transporting mechanisms of the character embodied in my copending application, Serial No. 767,798, filed August 9th, 1947, which are operable to transport a film strip from an immersing carrier to a delivery point exteriorly of an automatic photographic apparatus of the type embodied in my copending application, Serial No. 648,737, filed February 19th, 1946, now Patent No. 2,541,016 dated February 13, 1951.

It is a purpose of my present invention to improve, by simplification in both structure and mode of operation, the aforesaid film transporting mechanism, and in so doing to effect drying and positive transfer of the film strip from the film carrier to the point of delivery with each operation of the apparatus. In simplifying the structure of my previous mechanism, I eliminate the use of various levers, springs, cams, and clamping jaws which, of necessity, increase the cost of manufacture of the mechanism and introduce operating factors unreliable as to the automatic gripping, transfer and release of the film strip. Instead, my mechanism embodies feed rollers so mounted in relation to the carrier and delivery opening that when driven they function to grip and feed the film strip from the carrier to the delivery point. In using feed rollers with a carrier reciprocal in a succession of different vertical paths, such as the carrier in my aforesaid applications, it is necessary that those rollers which first grip the film strip be moved clear of the carrier so as not to obstruct the latter's movement laterally into the last vertical path in which it is adapted to move incident to its immersion in the last vessel for rinsing before beginning a succeeding cycle of operation. In my mechanism such movement of the aforesaid rollers is effected automatically upon cessation in operation of the driving means for the rollers, while movement of the rollers into film gripping position is effected automatically with each operation of the driving means, and in such timed relation to the upward vertical movement of the carrier that the rollers are in film-receiving position as the carrier reaches its uppermost position.

I will describe only two forms of film strip transporting mechanisms each embodying my invention, and one of which is shown in association with the apparatus of my aforesaid application, and will then point out the novel features thereof in claims.

In the accompanying drawings:

Fig. 3 is a vertical sectional view taken on the line 3—3 of Fig. 1, and showing the mechanism in active position for transfer of the film strip, but with the film carrier of the apparatus ascending to the mechanism as indicated by the arrow.

Fig. 4 is a view on an enlarged scale, of the mechanism as it appears in Fig. 3, but with the film strip partly fed to the delivery point of the apparatus.

Fig. 5 is a view similar to Fig. 3, but showing the carrier at the top of its movement, and the film strip gripped by certain of the feed rollers of my mechanism.

Fig. 6 is a vertical sectional view taken on the line 6—6 of Fig. 5.

Fig. 7 is a view similar to Fig. 5 showing my mechanism in an inactive position in which it clears the carrier to permit the required lateral movement of the latter.

Figure 1:
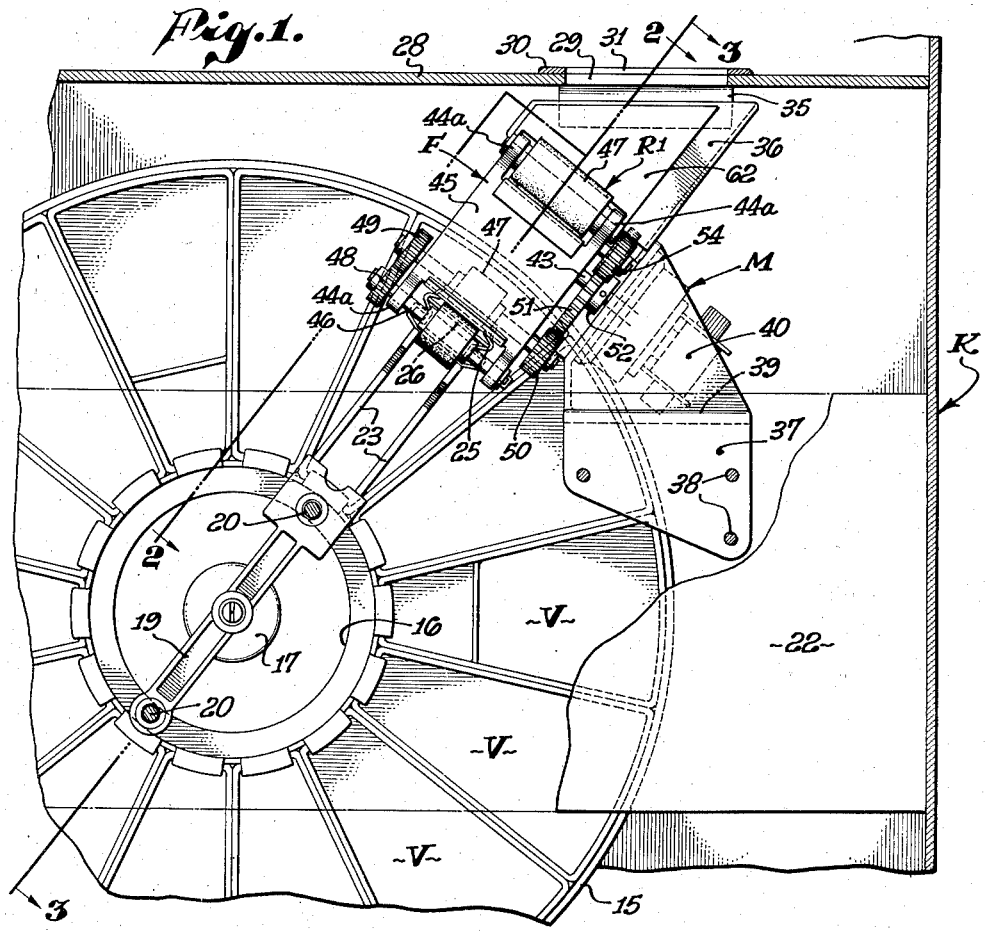
Fig. 1 is a fragmentary view showing in plan section a part of my aforesaid photographic apparatus, with the film transporting mechanism of my invention associated therewith and appearing in top plan.

Having specific reference to Fig. 1 of the drawings, K designates generally a casing or housing of the automatic photographic apparatus in which is contained the film transporting mechanism of my invention, and also those parts of the apparatus with which my mechanism is associated and which I will now briefly describe. A circular series of vessels V are supported on a stationary platform 15 (see Fig. 1), and these vessels are shaped to provide between the inner ends thereof, a vertical opening 16 in which is situated a vertically disposed fluid pressure cylinder 17 containing a piston 18 connected rotatably at its upper end to a cross arm 19, which is slidable vertically on a pair of rods 20. These rods are secured at their upper ends to a wheel 21 of a pawl and ratchet mechanism designated generally at P mounted on the under side of a horizontal partition 22, and which mechanism is operable to rotate the rods in a step-by-step movement. This mechanism and its mode of operation is clearly set forth in my copending application, Serial No. 648,737, filed February 19th, 1946.

The cross arm 19 is formed with a depending extension 23 to the lower end of which is fixed a bracket 24 in which is mounted a carrier 25 for a film strip 26 so as to be held in fully extended position therein. At its upper end the carrier is provided with complemental guides 27 spaced one from the other to expose opposite sides of the upper end of the film strip in order that it may be gripped and removed from the carrier by means of my transporting mechanism.

The casing K includes a front vertical wall 28 which, at a point above the vessels B and the carrier 25, is formed with a horizontal slot 29 which constitutes a delivery point through which the film strip 26 is adapted to be discharged from the casing to the vendee of the apparatus. On the outer side of the wall 28 is fixed an escutcheon plate 30 formed with a slot 31 in registration with the slot 29 at the outer side thereof. As best shown in Fig. 4 the slot 29 is of tapered form in cross section to provide a relatively wide entrance at the inner side of the wall 28 and a relatively narrow exit at the outer side of the wall. This tapered form of the slot also serves to accommodate a trap door 32 pivoted on a pin 33 secured in a bracket 34 at the inner side of the wall 28.

The mounting of the door is such that it normally occupies the vertical position shown in Fig. 3 to block the slot against any one tampering with my transferring mechanism which is situated adjacent the opening. The closed position of the door is defined by a bridge plate 35, and the door is of arcuate form so that it is free to swing inwardly of the slot 29 under movement of the film strip 26 outwardly through the slot, as illustrated in Fig. 4. The bridge plate 35 coacts with the door in completely blocking the slot 29 against the extension of any instrument inwardly through the slot, and it also serves to bridge the space between the wall 28 and a platform 36 over which the film strip 26 is adapted to be moved to the slot 29 by the transporting mechanism of my invention.

Figure 2:
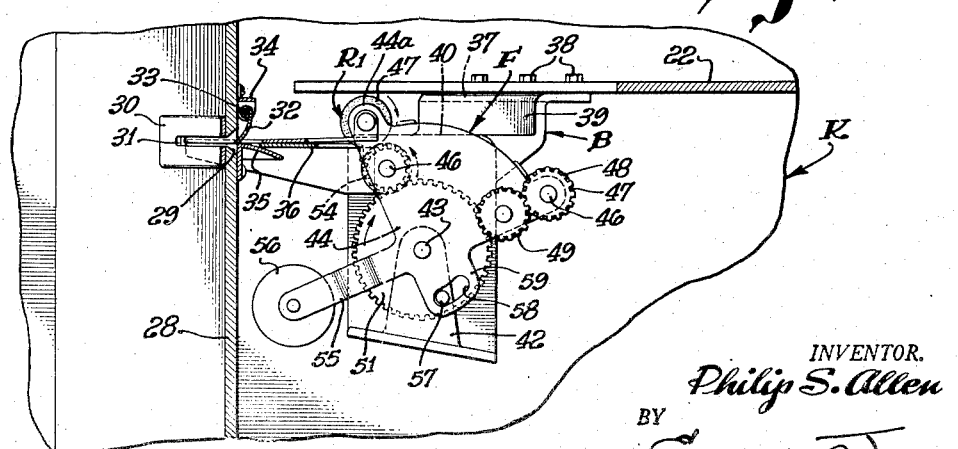
Fig. 2 is a vertical sectional view taken on the line 2—2 of Fig. 1, and showing the mechanism in inactive position.

My mechanism in the instant form, comprises a bracket B having an upper horizontal lip 37 secured by bolts 38 to the partition 22 (see Fig. 2). Extending downwardly from this lip is a vertical bracket portion 39, and downwardly inclined from the latter is a portion 40, from which depends an L-shaped portion 41. Fixed to and extending upwardly from the bottom part of the bracket portion 41 is a pair of parallel spaced ears 42, the innermost of which is spaced from the vertical part of the portion 41. In these ears is journalled a shaft 43 which is axially alined but connected to the shaft of an electric motor M, the latter being suitably secured to one side of the vertical part of the portion 41 (see Fig. 1).

Mounted for oscillation on the shaft 43 and between the ears 42 is a frame designated generally at F. This frame is made up of two sector shaped plates 44 fixedly connected at their curved edges by a cross plate 45 of arcuate form. Two pairs of feed rollers R and R1 are mounted in ears 44a on the frame F at two of the corners of the plates 44 so as to be disposed at an angle of substantially 90 degrees to each other, and with the rollers of each pair on a radial line intersecting the axis thereof and the shaft 43.

Each feed roller comprises a shaft 46 to which is fixed a hub 46a having secured thereon a sleeve 47 constructed of compressible slightly porous rubber or other suitable material. The spacing of the shafts 46 of the rollers of either pair, is such that the sleeves 47 are under slight compression at their points of contact for the dual purpose of firmly gripping and positively feeding a film strip therebetween, and to set up frictional resistance to rotation of the rollers sufficient to produce a frame moving function which will be more fully described hereinafter.

The rollers R are of less length than the rollers R1 in order that they may be extended between the guides 27 of the film carrier 25 to grip the film strip. As best shown in Fig. 1, the shaft 46 for one of the rollers R is provided at one end with a pinion 48 which constantly meshes with a similar pinion 49 fixed on the shaft 46 for the other roller of this pair. On the other end of this latter shaft is fixed a pinion 50 which constantly meshes with a gear 51 having a hub 52 keyed to the motor shaft 43, as best shown in Fig. 1. The shaft 46 of the lower roller of the pair R1 is provided with a pinion 54 which meshes with the gear 51 to drive such lower roller, and through frictional contact with the upper roller to drive the latter in the opposite direction.

Referring again to Fig. 2, one of the frame plates 44 has an arm 55 fixed thereto, and carrying at its outer end a weight 56 for urging the complete frame to the extreme position shown, which I term an inactive position, that is defined by a pin 57 fixed to one of the ears 42 and engaging within a slot 58 of an extension 59 of the aforesaid plate 44. This pin and slot connection also defines another extreme position of the frame F as illustrated in Figs. 3 and 5, which position I term the active position for feeding a film strip from the carrier 25 to the delivery opening or slot 29.

The arc of the cross plate 45 of the frame F is on substantially the same radius as are the meeting faces of the rollers R and R1, in order that it may act as a guide to direct a film strip from the rollers R to the rollers R1. Preferably, the lower or concave side of the cross plate 45 is covered by a sheet 60 having a smooth surface so as not to obstruct movement of the film strip from one pair of rollers to the other or to scratch the film strip. This sheet 60 is provided at its opposite ends with flanges 61 engaging the opposite ends of the cross plate 45 for securing the sheet to the plate.

The hereinbefore referred to platform 36 has a depending flange 36a which is welded or otherwise secured to the vertical part of the bracket portion 41, and so that the platform is on a level corresponding to that of the delivery slot 29 and slightly below the meeting faces of the rollers R1.

To prevent possible upward curling of the film strip as it leaves the rollers R1 and passes onto the platform 36, and to thus insure delivery of the film strip to and through the delivery slot 29, a guide plate 62 is positioned at the upper side of the platform and pivotally mounted on the frame F by ears 63 engaging the opposite end portions of the shaft of the upper roller of the pair R1. Normally this guide plate rests on the platform 36, but by virtue of its pivotal mounting it is free to be elevated by the film strip to allow the latter to pass to the delivery opening, but in so doing exerting downward pressure on the strip to hold it flat on the platform and thus coacting with the platform to guide the strip into the delivery opening.

The operation of my film transporting mechanism in its association with that part of the photographic apparatus illustrated herein, is as follows:

Upon reciprocation of the piston 18 and through operation of the mechanism P the carrier 25 is reciprocated successively in the vessels moving in a clockwise direction as when viewed in Fig. 1, to subject the film strip 26 in the carrier to the actions of the various developing, rinsing, and fixing solutions in the series of vessels, until the carrier is reciprocated in that vessel directly below by transporting mechanism, for a final rinsing of the film strip. It is during the final upward movement of the carrier in this reciprocating movement that my mechanism is set into operation through any suitable means (not shown) for energizing the motor M. Upon energizing the motor the gear 51 is driven in a clockwise direction as when viewed in Fig. 3, tending to drive the pinions 50 and 54 about their own axes. Since the sleeves 47 of the rollers R and R1 are compressed one against the other they set up a resistance to driving of these pinions and, as a consequence, upon initial rotation of the gear 51 the pinions are rotated with the gear and not on the gear. As a result the frame, pinions and rollers are moved to the active position shown in Fig. 3 and no further because of the pin 57. Once the pinions and rollers reach this active position they no longer can rotate with the gear 51, and hence, they are now driven about their own axes to drive all of the other pinions and thereby drive the rollers of each pair in opposite direction, as indicated by the arrows in Fig. 3.

In the active position of the rollers the pair R are now in a lowered position such that as the carrier 25 moves upwardly the upper projecting end of the film strip 26 will pass between the two, and under rotation of the latter the film will be drawn upwardly and outwardly of the carrier. The gripping of the strip by the rollers is illustrated in Fig. 5, while from a consideration of Fig. 4, it will be seen that the cross plate 45 guides the upper end of the film strip from the rollers R to and between the rollers R1 where, under the driving action of the latter the film will be fed forwardly over the platform 36 and beneath the guide plate 62 toward the delivery slot 29. As the leading end of the film strip approaches the door 32 it swings the latter outwardly so that it can pass through the slot 29 for delivery to the vendee of the apparatus.

In order to prevent the rollers R from obstructing lateral movement of the carrier 25 from the vessel directly therebelow to the next and last vessel of the series, the rollers R must be elevated out of the path of movement of the carrier or back to the normal inactive position shown in Fig. 7. Such movement of the rollers is effected by mere deenergization of the motor M, for when this transpires the weight 56 becomes active to return the frame F to its original position, and in so doing elevates the rollers R from between the guides 27. It will be understood that my mechanism remains in this inactive position until the motor M is again energized which occurs at the proper instant in the cycle of operation of the carrier 25 to remove from the latter a second film strip which has been deposited into the carrier under a second cycle of operation of the photographic apparatus.

Because the rollers R1 are compressible and pressed one against the other, the water remaining on the film strip as a result of the final rinsing operation, will be removed by the rollers so that the film as finally discharged from the apparatus is dry.

Figure 8:
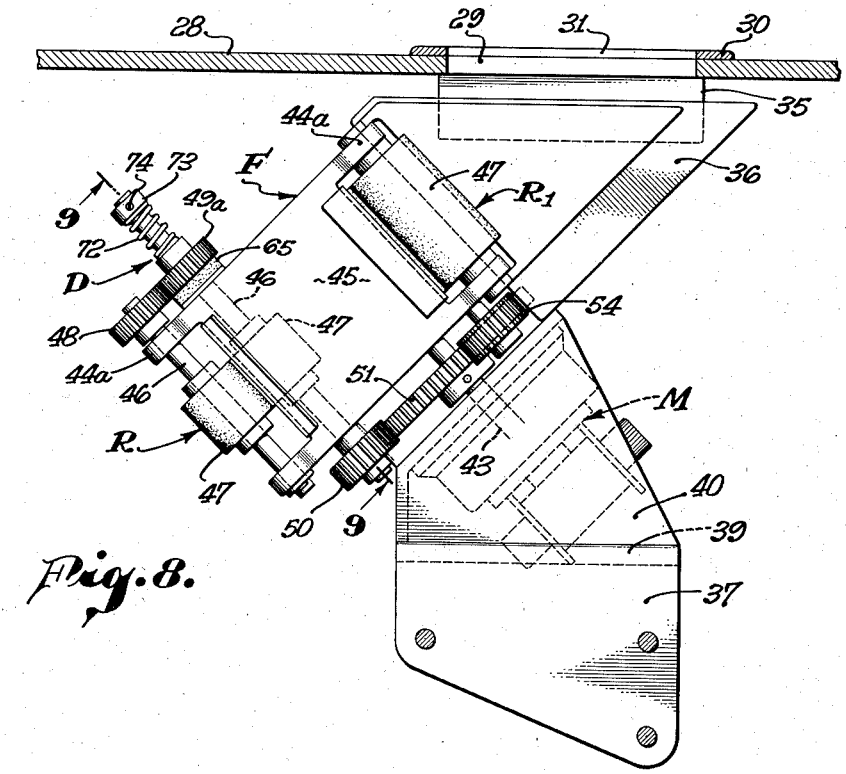
Fig. 8 is a view showing in top plan another form of film transporting mechanism embodying my invention.
Figure 9:
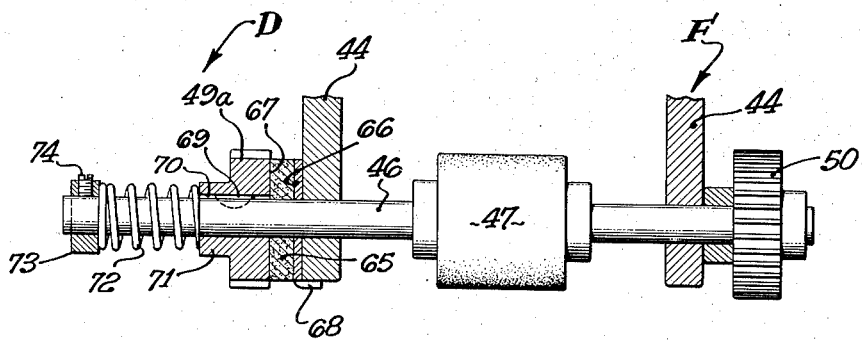
Fig. 9 is an enlarged sectional view taken on the line 9—9 of Fig. 8.

Referring now to Figs. 8 and 9 I have here shown a modified form of film transporting mechanism in which movement of the frame F from inactive to active position is attained by frictional resistance applied indirectly to one of the roller shafts, rather than by the frictional resistance between the rollers of either or both pair as in the first form of my mechanism. The means for applying such friction to resist rotation of the roller shaft is adjustable to vary the degree of applied friction as well as to compensate for wear of the parts concerned and thus maintain the requisite degree of friction necessary to insure movement of the frame F to active position upon energization of the motor M.

The instant mechanism is identical in structure to the first mechanism, with the exception that the rollers of each pair R and R1 peripherally contact with each other with only sufficient pressure to feed the film strip therebetween when the frame F is moved to active position, and a frictional resistance producing device generally indicated at D, is associated with the pinion 49a and the shaft 46 therefor.

In the present instance the device D comprises a friction disk 65, which may be formed of leather, surrounding the shaft 46 for the pinion 49a and interposed between a metal plate 66 and the confronting flat face 67 of the pinion. The plate 66 bears against the outer face of the frame plate 44 and is held against rotation by a finger 68 bent to engage one edge of the plate 44. The pinion 49a is splined to the shaft 46 by a key 69 fixed to the shaft and disposed within a slot 70 in the pinion so as to cause rotation of the pinion with the shaft and yet allow movement of the pinion longitudinally on the shaft. The pinion is formed with an annular flange 71 against which bears one end of an expansible spring 72 coiled about the shaft 46, the other spring end engaging a collar 73 secured by a set screw 74 to the shaft. Thus the spring acts to press the pinion 49a against the disk 65, and the degree of pressure is variable in accordance with the adjustment of the collar 73 lengthwise on the shaft as afforded by the screw 74.

In operation, the friction disk 65 serves to hold the pinion 49a against rotation by the shaft 46 when the frame F is in inactive position and the motor M is first energized. In consequence, the pinion 50 is caused to rotate with and not on the gear 51 to swing the frame F to the active position illustrated in Fig. 5. Upon reaching this position as limited by the pin 57, the disk 65 is no longer effective to hold the pinion 50 against turning, and hence the pinion now operates to drive the other pinions and thereby drive the rollers R and R1 to withdraw the film strip 26 from the carrier 25 and discharge it from the casing through the delivery slot 29.

The device D is in effect a friction clutch, and by virtue of the adjustability thereof afforded by the collar 73 and the screw 74, it can be caused to function as intended irrespective of the fractional horsepower of the motor employed, and to compensate for wear and frictional loss of the disk 65.

Although I have herein shown and described only two forms of film transporting mechanisms each embodying my invention, it is to be understood that various changes and modifications may be made therein without departing from the spirit of my invention and the spirit and scope of the appended claims.

What I claim is:

1. Mechanism for transporting a film strip from a laterally movable carrier to a delivery point at one side of the carrier, including: two pairs of feed rollers; a frame on which said pairs of rollers are mounted in spaced relation one to the other; a support on which said frame is pivoted to occupy one extreme position in which one pair of rollers can receive therebetween the end of a film strip in the carrier, and another extreme position in which said one pair of rollers is out of the path of lateral movement of the carrier; means for urging said frame to the last mentioned extreme position; and means for driving the rollers of each pair in opposite directions and moving said frame to the first mentioned extreme position.

2. Mechanism as embodied in claim 1, wherein the rollers of each pair engage each other with sufficient friction to initially resist rotation thereof by said means, resulting in movement of said frame to the first mentioned position against the action of said urging means.

3. Mechanism for transporting a film strip from a vertically and laterally movable carrier to a laterally disposed delivery point, including: a support; a frame pivoted on said support; rollers mounted on said frame in pairs spaced about the pivot thereof, the rollers of each pair having pressure contact one with the other sufficient to set up frictional resistance to rotation thereof; means for urging said frame to one extreme position about its pivot in which one pair of rollers is out of the path of lateral movement of the carrier; a motor having its drive shaft coaxial with the pivot of said frame; and gears operatively connecting said motor shaft to said rollers for driving the rollers of each pair in opposite directions, and under the resistance to rotation thereof offered by the contact between the rollers of each pair, to move the rollers bodily about the pivot of said frame, and the frame from the urged position to another extreme position in which that pair of said rollers out of the path of lateral movement of the carrier, is moved into receiving relation to the film strip in the carrier.

4. A transporting mechanism for a film strip, including: a support; a frame pivoted on said support; two pairs of feed rollers mounted on said frame in spaced relation circumferentially of the frame pivot, the rollers of each pair in frictional contact with each other; means for biasing said frame to one extreme position about its pivot; a motor; and gears operatively connecting said motor to said rollers to drive the rollers of each pair in opposite directions, the resistance to rotation offered by the frictional contact between the rollers of each pair operating to resist initial driving thereof so as to cause movement of said frame to another extreme position about its pivot and against the action of said biasing means.

5. Mechanism as embodied in claim 4, wherein said frame has a portion extending from one pair of rollers to the other, and continuously curved at one side to guide a film strip fed from one pair of rollers to the other pair of rollers.

6. Mechanism as embodied in claim 4, wherein said frame has a portion extending from one pair of rollers to the other, and continuously curved at one side to guide a film strip fed from one pair of rollers to the other pair of rollers; and a smooth surfaced plate lining the curved side of said portion.

7. Mechanism for transporting a film strip from one point to another, including: a support; a motor fixed to said support and having its shaft journalled therein; a frame pivoted on said shaft; a weight for urging said frame in one direction about said shaft; a gear fixed to said shaft; two pairs of rollers mounted in said frame in spaced relation circumferentially of said shaft; intermeshing pinions on said rollers with one pinion of each pair meshing with said gear; said frame having a portion for guiding a film strip from one pair of rollers to the other, the rollers of at least one pair having frictional contact with each other sufficient to momentarily resist rotation thereof by said motor, whereby said frame is rotated about said shaft in a direction opposite to that in which it is urged by said weight; and coacting means on said support and said frame for limiting movement of said frame about said shaft in either direction.

8. In combination: a casing; a carrier for a film strip vertically and laterally movable in said casing; said casing having a vertical wall formed with a delivery opening laterally of said carrier; a support within said casing; a frame pivoted on said support for movement in either direction about a horizontal axis to occupy either of two extreme positions; feed rollers carried by said frame, and arranged thereon in pairs spaced one from the other circumferentially of said axis, with one pair out of the path of lateral movement of said carrier when said frame is in one extreme position; means for urging said frame to the last mentioned extreme position; driving means for said rollers including a gear rotatable about an axis coaxial with said horizontal axis, and pinions on said rollers certain of which mesh with said gear to rotate the rollers of each pair in opposed directions; at least the rollers of one pair having sufficient frictional contact with each other to resist initial driving of the rollers by said gear, thereby causing said meshing pinions to rotate with said gear before rotating thereon, and thus operating to move said frame to the other extreme position in which said one pair of rollers is moved into the path of movement of the film strip to grip and feed the latter from said carrier to the other pair of rollers, and from the latter to and outwardly of said opening.

9. A combination as embodied in claim 8, wherein a platform is fixed in said casing to support the film strip at the level of said opening as it is fed to the latter; and a member pivoted on said frame and coacting with said platform to guide the film strip into said opening.

10. A combination as embodied in claim 8, wherein a platform is fixed in said casing to support the film strip at the level of said opening as it is fed to the latter; a member pivoted on said frame and coacting with said platform to guide the film strip into said opening; a door pivoted on said wall above said opening to normally close the latter, and a fixed ledge spanning said wall and platform and positioned to prevent movement inwardly of said door to open said opening from the outer side of said wall.

11. A transporting mechanism for a film strip, including: a support; a frame pivoted on said support to occupy either of two extreme positions; a weight for urging said frame to one extreme position; two pairs of shafts journalled in said frame; feed rollers on said shafts; a motor; a gear driven by said motor; pinions on said shafts one of which meshes with said gear; and a friction device associated with one of said pinions and its respective shaft for restraining that pinion meshing with said gear against rotation about its own axis and to thus cause said pinion to rotate with said gear, whereby said frame is moved to the other extreme position before said pinion is released to rotate about its own axis to in turn drive the other pinion and thus drive said feed rollers.

12. Mechanism for transporting a film strip as embodied in claim 11, wherein said device is adjustable to take up wear of its parts and to vary the amount of friction produced thereby.

13. Mechanism for transporting a strip from one point to another, including: a frame; a pair of strip feeding rollers on the frame having compressible peripheries and the spacing of the roller axes causing the roller perpheries to be compressed at their points of contact with each other and to thereby set up frictional resistance to rotation thereof in opposite directions; means for mounting the frame for rotative movement about a fixed axis to occupy either of two positions; means for urging the frame to one position; pinions fixed to the axes of said rollers and meshing with each other; a driving gear mounted coaxially of the frame; and intermeshing pinions coaxial with and fixed to said rollers and one of which meshes with the driving gear so as to drive said rollers; the frictional resistance offered by the roller perpheries acting to initially resist rotation of the rollers by the driving gear to cause that pinion meshing with the driving gear to rotate on the latter thereby moving the frame from its urged position to the other position whereupon the driving gear operates to drive said pinions to rotate said rollers.

14. A transporting mechanism for a film strip, including: a support; a frame pivoted on said support to occupy either of two extreme positions; a weight for urging said frame to one extreme position; two pairs of shafts journalled in said frame; feed rollers on said shafts; a motor; a gear driven by said motor; pinions on said shafts one of which meshes with said gear and another of which is splined on its respective shaft; a friction element on said respective shaft; and a spring urging the splined pinion against said element so that the latter acts to restrain that pinion meshing with said gear against rotation about its own axis and to thus cause said pinion to rotate with said gear, whereby said frame is moved to the other extreme position before said pinion is released to rotate about its own axis to in turn drive the other pinion and thus drive said feed rollers.

PHILIP S. ALLEN.

REFERENCES CITED

The following references are of record in the file of this patent:

UNITED STATES PATENTS

| Number | Name | Date |
|---|---|---|
| 1,373,869 | Currie | Apr. 5, 1921 |
| 1,571,572 | Craig | Feb. 2, 1926 |
| 1,956,566 | Eckhard | May 1, 1934 |